(12) United States Patent
Drysdale

(10) Patent No.: US 6,496,538 B1
(45) Date of Patent: Dec. 17, 2002

(54) METHOD AND APPARATUS FOR MOTION ESTIMATION FOR DIGITAL VIDEO ENCODING

(75) Inventor: T. Garrett Drysdale, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/477,115

(22) Filed: Dec. 31, 1999

(51) Int. Cl.[7] .................................................. H04B 1/66
(52) U.S. Cl. ................... 375/240.16; 382/236; 348/699
(58) Field of Search ........................ 375/240.16, 240.12, 375/240.22, 240.24, 240.17, 240.02; 348/402.1, 407.1, 409.1, 412.1, 416.1, 431.1, 430.1, 699; 382/236, 251, 232; H04N 7/12, 7/30

(56) References Cited

U.S. PATENT DOCUMENTS 5,778,190 A * 7/1998 Argarwal ............... 375/240.17
6,020,934 A * 2/2000 Greenfield et al. .... 375/240.16
6,128,047 A * 10/2000 Chang et al. .......... 375/240.16

* cited by examiner

*Primary Examiner*—Chris Kelley
*Assistant Examiner*—Gims Philippe
(74) *Attorney, Agent, or Firm*—Blakely, Sokoloff, Taylor & Zafman LLP

(57) ABSTRACT

A method for determining motion estimation in a set of video frames including the comparing of a first macroblock from a video frame in the set of video frames to a second macroblock in a reference video frame to determine a differential value. Then, the differential value is compared to a comparison value. If the differential value is not smaller than the comparison value, then the differential value is compared to a minimal differential value. If the differential value is less than or equal to the minimal differential value, then the differential value is stored as the minimum differential value. An apparatus for performing the method.

24 Claims, 3 Drawing Sheets

METHOD AND APPARATUS FOR MOTION ESTIMATION FOR DIGITAL VIDEO ENCODING

FIELD OF THE INVENTION

This invention is related to the field of use of image processing. More particularly, this invention is directed to a method and apparatus for motion estimation for digital video encoding.

BACKGROUND

Video image capture using a digital camera has become very prevalent. Video capture may be used for such applications as video concerning, video editing, and distributed video training. Many components of hardware and software need to work seamlessly to both get the video data (also referred to as a video "stream") from the hardware through the various layers of software on the personal computer (PC) and made visible on a display medium such as a monitor.

Motion estimation is performed in a variety of video encoding algorithms. For example, the moving pictures experts group (MPEG) standards for compression, decompression, processing, and coded representation of moving pictures, audio and their combination utilize motion estimation in their algorithms. See, *Coding of Moving Pictures and Audio*, International Organisation for Standardisation Organisation Internationale de Normalisation, ISO/IEC JTC1/SC29/WG11, June 1996.

Motion estimation is a pattern matching technique, and is extremely expensive for conventional computers to perform. Essentially, motion estimation involves comparing segments of one image frame against the previous image frame to determine if the new segment can be simply repeated at a new location rather than retransmitted. Image segments may be such sizes as 8 pixels by 8 pixels or 16 pixels by 16 pixels in size. For example, if an image is 640 pixels wide and 480 tall, it may be divided into 4,800 segments that are 8 square pixels in size if (i.e., 80 segments wide by 60 segments tall). At 30 images per second, there is a minimum of 144,000 segments per second on which to operate. Considering each pixel may be represented by many bits of information for color images (e.g., 1-bit for black and white image pixels, and 2 or more bits-typically 32-bits-for it color image pixels), billion of bits have to be processed per second.

Many current implementations require hardware compression in order to achieve "real-time" compression. That is because it takes more computational power to compress a video stream than it does to play it back. A significant part of the computation process involves motion estimation. Thus, it would be desirable to find a fast technique to compute motion estimation.

SUMMARY

A method for determining motion estimation in a set of video frames including the comparing of a first macroblock from a video frame in the set of video frames to a second macroblock in a reference video frame to determine a differential value. Then, the differential value is compared to a comparison value. If the differential value is not smaller than the comparison value, then the differential value is compared to a minimal differential value. If the differential value is less than or equal to the minimal differential value, then the differential value is stored as the minimum differential value.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention provides a method and apparatus for motion estimation for digital video encoding. In one mode of operation in performing motion estimation of the present invention, a macro block (e.g., a 16 by 16 pixel block) is compared to areas of the same size in a reference frame by taking a sum of absolute differences (SAD) between the two blocks. Then, a fraction of the SAD is used for the compare after the first iteration of the loop that compares the minimum SAD. The compare value is incremented each time through the loop until it matches the minimum SAD value for the last compare. This is in contrast to finding the minimum SAD from all the comparisons for the blocks made from within a specified area of the reference frame—meaning that all comparisons would have already have been performed before the minimum SAD has been found.

The pseudo-code for one embodiment of the present invention is as follows:

```
For (search list);
{
Real CurrentMinSAD=threshold;
Int SADIncrementValue=CurrentMinSAD/8;
Int SADCompareValue=CurrentMinSAD/8;
SAD=0;
For (j=0; j<8; j++)
{
Compute SAD for 2 lines;
Exit if SAD<=SADCompareValue;
SADCompareValue+=SADIncrementValue;
}
If (SAD<CurrentMinimumSAD)
{
CurrentMinSAD=SAD;
store NewMinVector ( );
}
}
``` where CurrentMinimumSAD is the current minimum sum of absolute differences (SAD), SADIncrementValue is the value by which the SADCompareValue is incremented. SADCompareValue is the value to which SAD is compared to allow an earlier exit of the loop before all the SAD's are compared.

Figure 1:
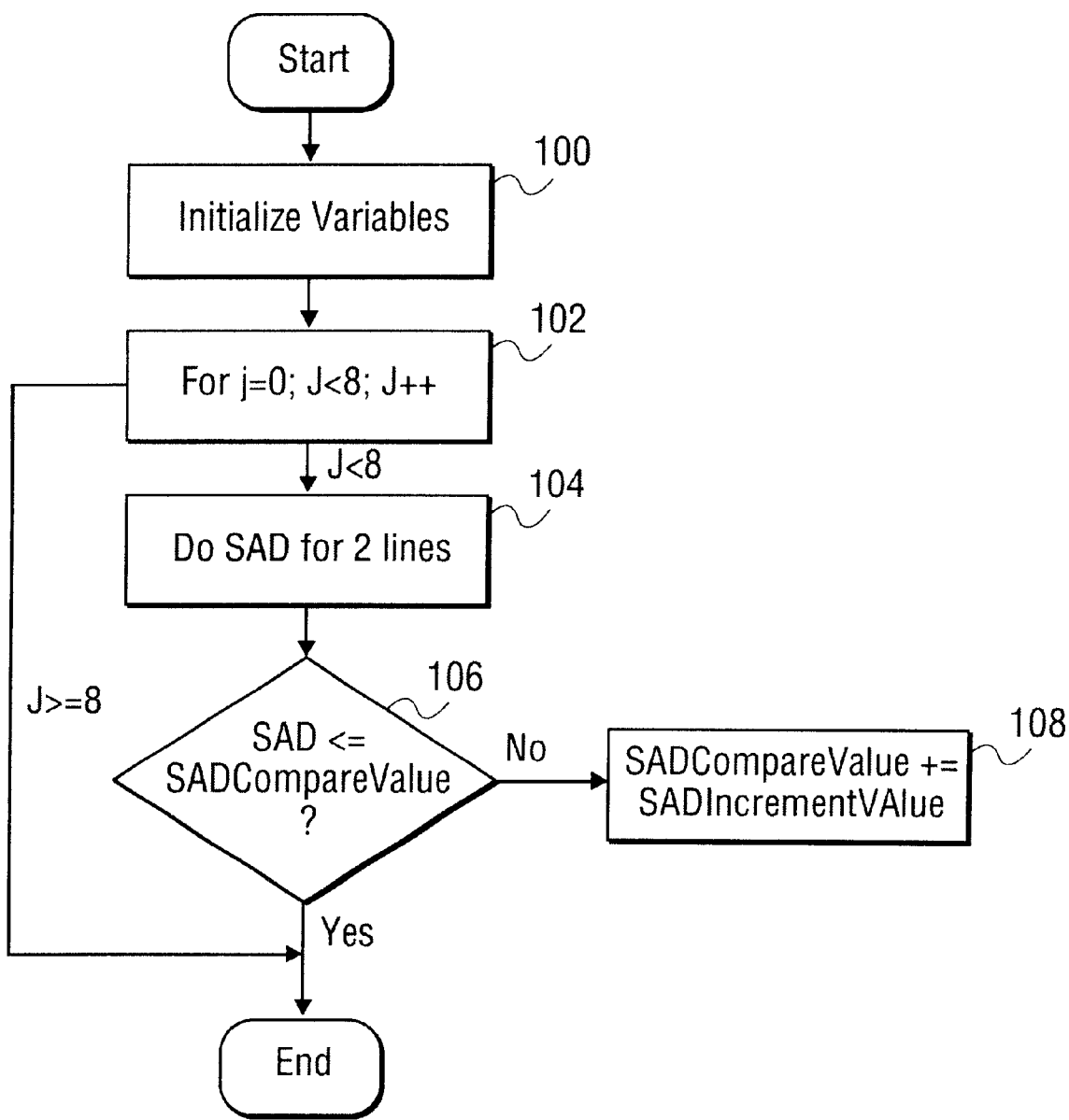
FIG. 1 is a diagram illustrating a process for motion estimation performed in accordance with one embodiment of the present invention.

FIG. 1 is a flow diagram illustrating the operation of the detection of the minimum SAD in an encoder according to one embodiment of the present invention. A series of images are first provided. These images are part of a sequence of frames from a video segment. In one embodiment, the images are captured by an imaging system, as described below, and provided for compression. In another embodiment, the images are retrieved from a video file.

In block 100, the variables for the system are initiated. These include SAD, SADIncrementValue, SADCompareValue, and CurrentMinSAD. CurrentMinSAD is set to a threshold amount; and, SADIncrementValue and SADCompareValue are set to an amount equal to CurrentMinSAD/8. In one embodiment, the threshold value for CurrentMinSAD is set to be equal to $15/64$ths. SAD is set to 0. Then operation continues with block 102.

In block 102, a "for" loop is started using a variable "j". The variable j starts at 0 and, while j is less than 8, operation continues with block 104. When j is greater than or equal to 8, operation comes out of the loop.

In block 104, the SAD is calculated. In one embodiment, the SAD is calculated for 2 lines. In one embodiment, the SAD is calculated using the following pseudo-code:

for (c=0; c<16; c++)
{
  temp=src[2i][c]−ref[2i][c];
  SAD=sum+ABS(temp);
  temp=src[2i+1][c]−ref[2i+1][c];
  SAD=sum+ABS(temp);
} where c is a variable for the count of the for loop, src[x][y] is the value of the macroblock at coordinates (x,y), ref[x][y] is the value of the macroblock at coordinates (x,y) of the reference frame, temp is a temporary variable for storing the difference between the macroblock of the current video frame and the macroblock of the reference frame.

In block 106, it is determined whether the calculated SAD is less than or equal to the SADCompareValue. If so, then the operation ends, which means that the process exits out of the It for loop as a new SAD that is lower than the CurrentMinimumSAD is found by comparing the current computed SAD with the CurrentMinimumSAD. Otherwise, operation continues with block 108.

In block 108, SADCompareValue is incremented by the SADIncrementValue. Which increases the chance that the for loop is to be exited, requiring fewer iterations of the for loop to find a qualified minimum SAD value.

Thus, the for loop may be exited by the for loop completing its iterations; or by the for loop reaching the end of its iteration.

Figure 2:
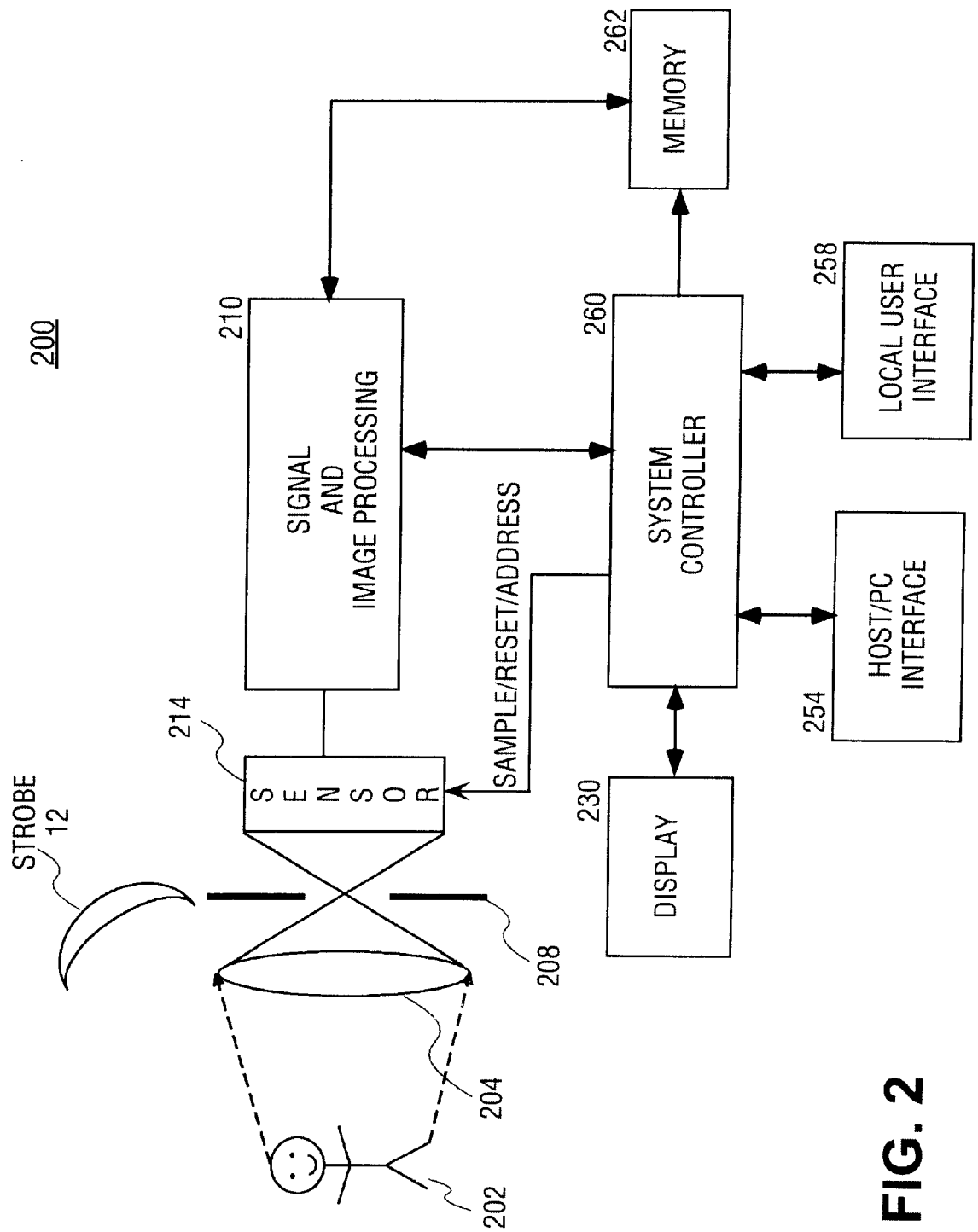
FIG. 2 is a block diagram of an imaging system configured in accordance with one embodiment of the present invention; and, FIG. 3 is a block diagram of a computer system configured in accordance with one embodiment of the present invention.

An embodiment of the invention included in an imaging system 200 is shown as a logical block diagram in FIG. 2. Imaging system 200 includes a number of conventional elements, such as an optical system having a lens 204 and aperture 208 that is exposed to the incident light reflected from a scene or object 202. The optical system properly channels the incident light towards a sensor array 214 that generates sensor signals in response to an image of object 202 being formed on sensor array 214. The various control signals used in the operation of sensor array 214, such as a RESET signal, a SAMPLE signal and an ADDRESS signal is generated by a system controller 260. System controller 260 may include a microcontroller or a processor with input/output (I/O) interfaces that generates the control signals in response to instructions stored in a memory such as a memory 262. In one embodiment, memory 262, which stores code/program instructions and data, may include both non-volatile programmable memory components and volatile memory components. System controller 260 also acts in response to user input via a local user interface 258 (as when a user pushes a button or turns a knob of system 200) or a host/PC interface 254 to manage the operation of imaging system 200. The functions of controller 260 may also be implemented as a logic circuit that is tailored to generate the control signals with proper timing. Host/PC interface 254 may also transfer the captured image data to an image processing and/or viewing system such as a computer separate from imaging system 200.

Imaging system 200 may use a display device such as a display 230 for displaying the captured image data. In one embodiment, imaging system 200 is a portable digital camera with display 230 as a LCD for showing the captured image data.

To obtain images, a signal and image processing block 210 is provided in which hardware and software operates according to image processing methodologies to generate captured image data in response to receiving the sensor signals. The captured image data is then stored in memory 262. In addition to storing this image data in memory 262, optional storage devices (not shown) may be used aboard system 200 for storing the captured image data. Such local storage devices may include a removable memory card.

After the captured image data is stored in memory 262, the system operates as described above to process the captured images to perform motion estimation. In another embodiment, the captured image data may be processed to perform motion estimation after the image is transferred to a host computer. For example, where the imaging system is a tethered digital camera connected to a host computer, the host computer may perform the motion estimation processing.

Figure 3:
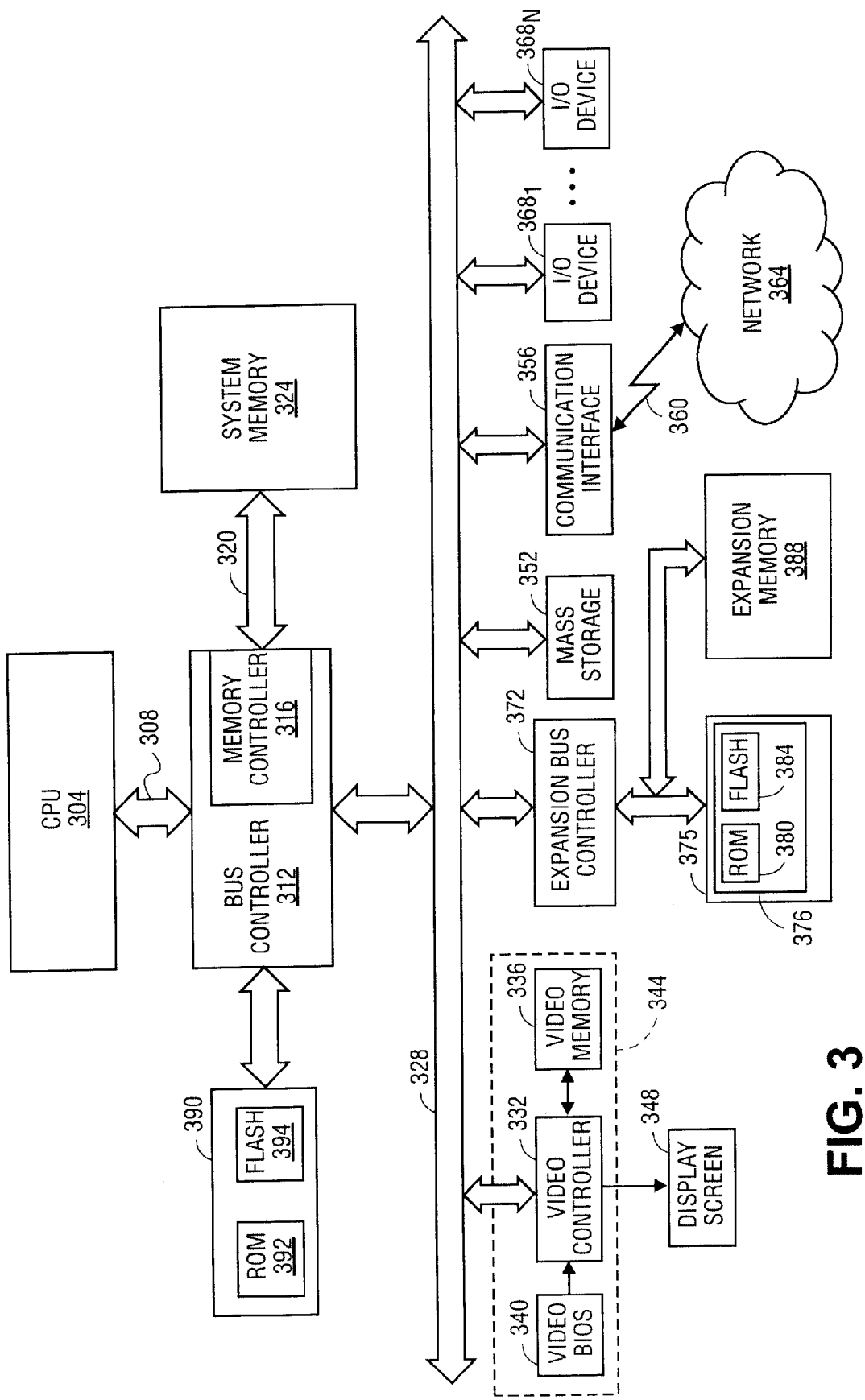

FIG. 3 illustrates a computer system 300 that may be used to implement embodiments of the present invention. Computer system 300 includes a central processing unit (CPU) 304. CPU 304 includes an Arithmetic Logic Unit (ALU) for performing computations, a collection of registers for temporary storage of data and instructions, and a control unit for controlling operation for the system 300. In one embodiment, CPU 304 includes any one of the x86, and Pentiumm™ series microprocessors as marketed by Intel™ Corporation, the K-6 series of microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 304. CPU 304 is not limited to microprocessor but may take on other forms such as microcontrollers, digital signal processors, reduced instruction set computers (RISC), application specific integrated circuits (ASIC), and the like. Although shown with one CPU 304, computer system 300 may alternatively include multiple processing units.

CPU 304 is coupled to a bus controller 312 by way of a CPU bus 308. Bus controller 312 includes a memory controller 316 integrated therein, although memory controller 316 may be external to bus controller 312. Memory controller 316 provides an interface for access by CPU 304 or other devices to a system memory 324 via a memory bus 320. In one embodiment, system memory 324 includes synchronous dynamic random access memory (SDRAM). System memory 324 may optionally include any additional or alternative high-speed memory device or memory circuitry. Bus controller 312 is coupled to a system bus 328 that may be a Peripheral Component Interconnect (PCI) bus (PCI Local Bus Specification, Rev. 2.2, 1998), or an Industry Standard Architecture (ISA) bus as promulgated by Institute of Electrical and Electronics Engineers (IEEE) Draft Standard P996, 1987. Coupled to system bus 328 is a video controller 332 (e.g., a graphics controller or a graphics engine), a mass storage device 352, a communication interface device 356, one or more input/output (I/O) devices 3681–368N, and an expansion bus controller 372. Video controller 332 is coupled to a video memory 336 (e.g., 8 Megabytes) and a video BIOS 340, all of which may be integrated onto a single card or device, as designated by numeral 344. Video memory 336 is used to contain display data for displaying information on a display screen 348, and video BIOS 340 includes code and video services for controlling video controller 332. In another embodiment, video controller 332 is coupled to CPU 304 through an Advanced Graphics Port (AGP) bus (not shown), as promulgated by Intel™ Corporation as Accelerated Graphics Port Interface Specification Revision 2.0, May 4, 1998.

A mass storage device 352 may include, but is not limited to, one or more hard disks, floppy disks, CD-ROM's, DVD-ROM's, tape drives, high density floppy disks, high capacity removable media, low capacity removable media, solid state memory devices, and combinations thereof. In addition, mass storage device 352 may include any other mass storage medium. A communication interface device 356 includes devices such as a network card or a modem interface for accessing a network. I/O devices 3681–368N include devices such as keyboards, mice, audio/sound cards, and printers. Expansion bus controller 372 is coupled to a nonvolatile memory 375 that includes a system firmware 376. System firmware 376 includes a system BIOS 382, which is for controlling, among other things, hardware devices in computer system 300. System firmware 376 also includes a ROM 380 and a flash memory 384. Expansion bus controller 372 is also coupled to an expansion memory 388 having RAM, ROM, and/or flash memory (not shown). Computer system 300 may additionally include a memory module 390 that is coupled to bus controller 312. In one embodiment, memory module 390 comprises a ROM 392 and flash memory 394.

As is familiar to those of ordinary skill in the art, computer system 300 further includes an operating system (OS) (not shown) and at least one application program, which may be loaded into system memory 324 from mass storage device 352 and launched during the operation of computer system 300. The OS may include any type of OS including, but not limited or restricted to, Microsoft DOS, Microsoft Windows™ (e.g., Windows 95™, Windows 198™, Windows NT™), Unix, Linux, and IBM OS/2. In general, the operating system is a set of one or more programs that control the operation of computer system 300 and the allocation of resources. An application is a set of one or more programs that performs tasks as desired by the user. In one embodiment, the application is configured to provide the functionality of the present invention.

In accordance with the practices of persons skilled in the art of computer programming, the present invention is described below with reference to symbolic representations of operations that are performed by computer system 300, unless indicated otherwise. Such operations are sometimes referred to as being computer-executed. It will be appreciated that operations that are symbolically represented include the manipulation by CPU 304 of electrical signals representing data bits and the maintenance of data bits at memory locations in system memory 324, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a CD-ROM, an optical disk, a hard disk, a fiber optic medium, or a radio frequency (RF) link. The computer data signal may include any signal that can propagate over a transmission medium such as electronic network channels, optical fibers, air, electromagnetic, and RF links. The code segments may be downloaded via computer networks such as the Internet.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for determining motion estimation in a set of video frames comprising:
  comparing a first macroblock from a video frame in the set of video frames to a second macroblock in a reference video frame to determine a differential value;
  comparing the differential value to a comparison value;
  if the differential value is not smaller than the comparison value, then comparing the differential value to a minimal differential value, where if the differential value is less than or equal to the minimal differential value, then storing the differential value as the minimum differential value; and
  incrementing the comparison value with an incremental value.

2. The method of claim 1, where determining the differential value includes determining a sum of absolute difference between the first macroblock and the second macroblock.

3. The method of claim 1, where the comparison value is a portion of a predetermined differential value.

4. The method of claim 1, where the incremental value is a portion of a predetermined differential value.

5. An article comprising a computer readable medium having instructions stored thereon, which when executed, causes:
  comparison of a first macroblock from a video frame in the set of video frames to a second macroblock in a reference video frame to determine a differential value;
  comparison of the differential value to a comparison value;
  if the differential value is not smaller than the comparison value, then comparison of the differential value to a minimal differential value, where if the differential value is less than or equal to the minimal differential value, then storage of the differential value as the minimal differential value; and
  incrementing of the comparison value with an incremental value.

6. The article of claim 5 where determination of the differential value includes determination of a sum of absolute difference between the first macroblock and the second macroblock.

7. The article of claim 5, where the comparison value is a portion of a predetermined differential value.

8. The article of claim 5, where the incremental value is a portion of a predetermined differential value.

9. An apparatus for determining motion estimation in a set of video frames comprising:

a processor;

a memory coupled to the processor, the memory including instructions stored therein, which when executed, causes:

comparison of a first macroblock from a video frame in the set of video frames to a second macroblock in a reference video frame to determine a differential value;

comparison of the differential value to a comparison value;

if the differential value is not smaller than the comparison value, then comparison of the differential value to a minimal differential value, where if the differential value is less than or equal to the minimal differential value, then storage of the differential value as the minimum differential value; and incrementing of the comparison value with an incremental value.

10. The apparatus of claim 9, where determination of the differential value includes determination of a sum of absolute difference between the first macroblock and the second macroblock.

11. The apparatus of claim 9, where the comparison value is a portion of a predetermined differential value.

12. The apparatus of claim 9, where the incremental value is a portion of a predetermined differential value.

13. A method for determining motion estimation in a set of video frames comprising:

comparing a first macroblock from a video frame in the set of video frames to a second macroblock in a reference video frame to determine a differential value;

comparing the differential value to a comparison value;

if the differential value is not smaller than the comparison value, then comparing the differential value to a minimal differential value, where if the differential value is less than or equal to the minimal differential value, then storing the differential value as the minimum differential value; and wherein the comparison value is a portion of a predetermined differential value.

14. The method of claim 13, where determining the differential value includes determining a sum of absolute difference between the first macroblock and the second macroblock.

15. The method of claim 13, further comprising incrementing the comparison value with an incremental value.

16. The method of claim 15, where the incremental value is a portion of a predetermined differential value.

17. An article comprising a computer readable medium having instructions stored thereon, which when executed, causes:

comparison of a first macroblock from a video frame in the set of video frames to a second macroblock in a reference video frame to determine a differential value;

comparison of the differential value to a comparison value;

if the differential value is not smaller than the comparison value, then comparison of the differential value to a minimal differential value, where if the differential value is less than or equal to the minimal differential value, then storage of the differential value as the minimal differential value; and wherein the comparison value is a portion of a predetermined differential value.

18. The article of claim 17 where determination of the differential value includes determination of a sum of absolute difference between the first macroblock and the second macroblock.

19. The article of claim 17, where the computer readable medium further having instructions stored thereon, which when executed, causes incrementing of the comparison value with an incremental value.

20. The article of claim 19, where the incremental value is a portion of a predetermined differential value.

21. An apparatus for determining motion estimation in a set of video frames comprising:

a processor;

a memory coupled to the processor, the memory including instructions stored therein, which when executed, causes:

comparison of a first macroblock from a video frame in the set of video frames to a second macroblock in a reference video frame to determine a differential value;

comparison of the differential value to a comparison value;

if the differential value is not smaller than the comparison value, then comparison of the differential value to a minimal differential value, where if the differential value is less than or equal to the minimal differential value, then storage of the differential value as the minimum differential value; and wherein the comparison value is a portion of a predetermined differential value.

22. The apparatus of claim 21, where determination of the differential value includes determination of a sum of absolute difference between the first macroblock and the second macroblock.

23. The apparatus of claim 21, where the memory further includes instructions stored thereon, which when executed, causes incrementing of the comparison value with an incremental value.

24. The apparatus of claim 23, where the incremental value is a portion of a predetermined differential value.

* * * * *

UNITED STATES PATENT AND TRADEMARK OFFICE
CERTIFICATE OF CORRECTION

PATENT NO. : 6,496,538 B1  Page 1 of 1
DATED : December 17, 2002
INVENTOR(S) : Drysdale It is certified that error appears in the above-identified patent and that said Letters Patent is hereby corrected as shown below:

<u>Column 1,</u>
Line 16, delete "concerning", insert -- conferencing --.
Line 40, after "in size", delete "if".
Line 45, after "32-bits-for", delete "it".

<u>Column 3,</u>
Line 35, before "for loop", delete "It".

<u>Column 8,</u>
Line 57, add claims 25, 26 and 27:

25. The article of claim 5, where the computer readable medium further having instructions stored thereon, which when executed, causes incrementing of the comparison value with an incremental value.
26. The apparatus of claim 9, where the memory further includes instructions stored thereon, which when executed, causes incrementing of the comparison value with an incremental value.
27. The apparatus of claim 13, where the incremental value is a portion of a predetermined differential value.

Signed and Sealed this

Sixth Day of January, 2004

JAMES E. ROGAN
*Director of the United States Patent and Trademark Office*